US008014384B1

United States Patent
Basore et al.

(10) Patent No.: US 8,014,384 B1
(45) Date of Patent: *Sep. 6, 2011

(54) INTELLIGENT NETWORK INTERFACE DEVICE FOR CALLER IDENTIFICATION MULTICASTING

(75) Inventors: David L. Basore, Little Silver, NJ (US); Barry S. Bosik, Marlboro, NJ (US); Moshiur Rahman, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 998 days.

This patent is subject to a terminal disclaimer.

(21) Appl. No.: 11/240,089

(22) Filed: Sep. 30, 2005

Related U.S. Application Data

(63) Continuation of application No. 10/026,307, filed on Dec. 18, 2001, now Pat. No. 7,113,503.

(51) Int. Cl.
*H04L 12/66* (2006.01)

(52) U.S. Cl. ........................................ 370/352

(58) Field of Classification Search .......... 370/352–356; 379/142.04, 142.06
See application file for complete search history.

(56) References Cited

U.S. PATENT DOCUMENTS

| 6,061,434 | A | 5/2000 | Corbett | |
|---|---|---|---|---|
| 6,141,058 | A * | 10/2000 | Lagoni et al. | 379/142.06 |
| 6,154,531 | A * | 11/2000 | Clapper | 379/142.14 |
| 6,330,235 | B1 | 12/2001 | Olson | |
| 6,510,210 | B1 * | 1/2003 | Baughan | 379/90.01 |
| 6,785,301 | B1 * | 8/2004 | Chapman et al. | 370/352 |
| 6,836,476 | B1 * | 12/2004 | Dunn et al. | 370/352 |
| 6,839,342 | B1 | 1/2005 | Parham | |
| 6,924,845 | B1 | 8/2005 | Wahlroos | |
| 7,190,773 | B1 * | 3/2007 | D'Silva et al. | 379/142.06 |
| 2002/0124060 | A1 | 9/2002 | Jinzaki | |
| 2003/0043260 | A1 * | 3/2003 | Yap et al. | 348/14.06 |
| 2004/0234056 | A1 * | 11/2004 | Heilmann et al. | 379/196 |
| 2005/0232246 | A1 * | 10/2005 | Dowling | 370/352 |
| 2006/0227957 | A1 * | 10/2006 | Dolan et al. | 379/212.01 |
| 2008/0049929 | A1 * | 2/2008 | Miloslavsky et al. | 379/265.12 |

OTHER PUBLICATIONS

PacketCable Specification PKT-SP-CMSS-I01-001128, 2000.*
"Caller ID" Webster's New World Computer Dictionary, 2003.*
Hogan, "Bell Atlantic Pitches Caller ID on TV", Nov. 15, 1999, Multichannel News, p. 40.

* cited by examiner

*Primary Examiner* — Kerri M Rose
(74) *Attorney, Agent, or Firm* — Andrew Gust; Guntin Meles & Gust, PLC

(57) ABSTRACT

The present invention relates to a network interface device and a communication network incorporating the network interface device. The network interface device may receive incoming calls placed from a copper loop network, a cable network or wireless network, determine CallerID information of the call and the IP address of at least one end device and multicast the CallerID information to at least one end device such as a television, stereo or computer, for example.

21 Claims, 2 Drawing Sheets

INTELLIGENT NETWORK INTERFACE DEVICE FOR CALLER IDENTIFICATION MULTICASTING

CROSS REFERENCE TO RELATED APPLICATIONS

This application is a continuation of, claims priority to, and incorporates by reference in its entirety, pending U.S. application Ser. No. 10/026,307, filed 18 Dec. 2001, and titled "Intelligent Network Interface Device for Caller Identification Multicasting".

TECHNICAL FIELD

The present invention relates to caller identification and more particularly to a system and method for CallerID multicasting.

BACKGROUND OF THE INVENTION

Caller identification is known in the art as a means of providing information on a telephone receiving an incoming call. The information provided may include caller's name or phone number. Although the party receiving the call may identify the caller before answering the phone using caller identification (CallerID) services, the caller may need to relocate to the vicinity of the telephone in order to examine the local display and identify the calling party. This may cause great frustration to telephone users because their close proximity to the telephone may be required in order to capitalize on CallerID services.

In order to alleviate this problem, CallerID information identifying an incoming call has been displayed on a television set. In this way, the called party would not have to interrupt his/her television viewing when the phone rang. If the called party was engrossed in a television program and the phone rang, the called party could remain in place in front of the television set and continue watching. A small display on the television screen would appear after the first ring of the phone indicating the caller's name and/or phone number. The called party could then decide if the call was worth answering or not. The advantage of this system is that the called party, if watching television, does not have to relocate from the television to the telephone to check the identity of the calling party and therefore does not have to interrupt viewing his/her favorite television show. If the incoming call is from an undesired party, the called party could continue watching television uninterrupted. Likewise, CallerID information may be transmitted to other designated appliances such that the called party may be apprised of the identity of the caller at various sites throughout the local region even if the called party is not in the immediate vicinity of the telephone.

However, such systems have been used for receiving PSTN calls received over standard telephone switching networks and have been unable to effectively manage calls received over other networks such as wireless or cable networks or calls received via hybrid fiber coax, for example.

Therefore, a need exists in the art for an intelligent network interface device for callerID multicasting of calls received through cable or wireless networks in addition to PSTN calls.

A further need exists in the art to provide a caller identification method and system for multicasting caller identification information received from calls over cable, wireless or PSTN networks such that a called party could receive caller identification information from any of such calls over a wide range of locations or end devices while performing a wide range of activities.

SUMMARY OF THE INVENTION

The present invention solves the above-mentioned problems by providing a system and method for managing calls received over a variety of networks including PSTN, wireless and cable networks that may utilize multi-signaling protocols. CallerID data and end device IP address and associated Fully Qualified Domain Name (FQDN) are identified from the incoming call. CallerID information may then be multicast to any number of end devices.

DETAILED DESCRIPTION OF THE INVENTION

The present invention provides systems and methods in which call identification data is received at a local site and multicast to a range of appliances or end devices. The call may be received from a variety of sources including cable, wireless and PSTN, for example.

Figure 1:
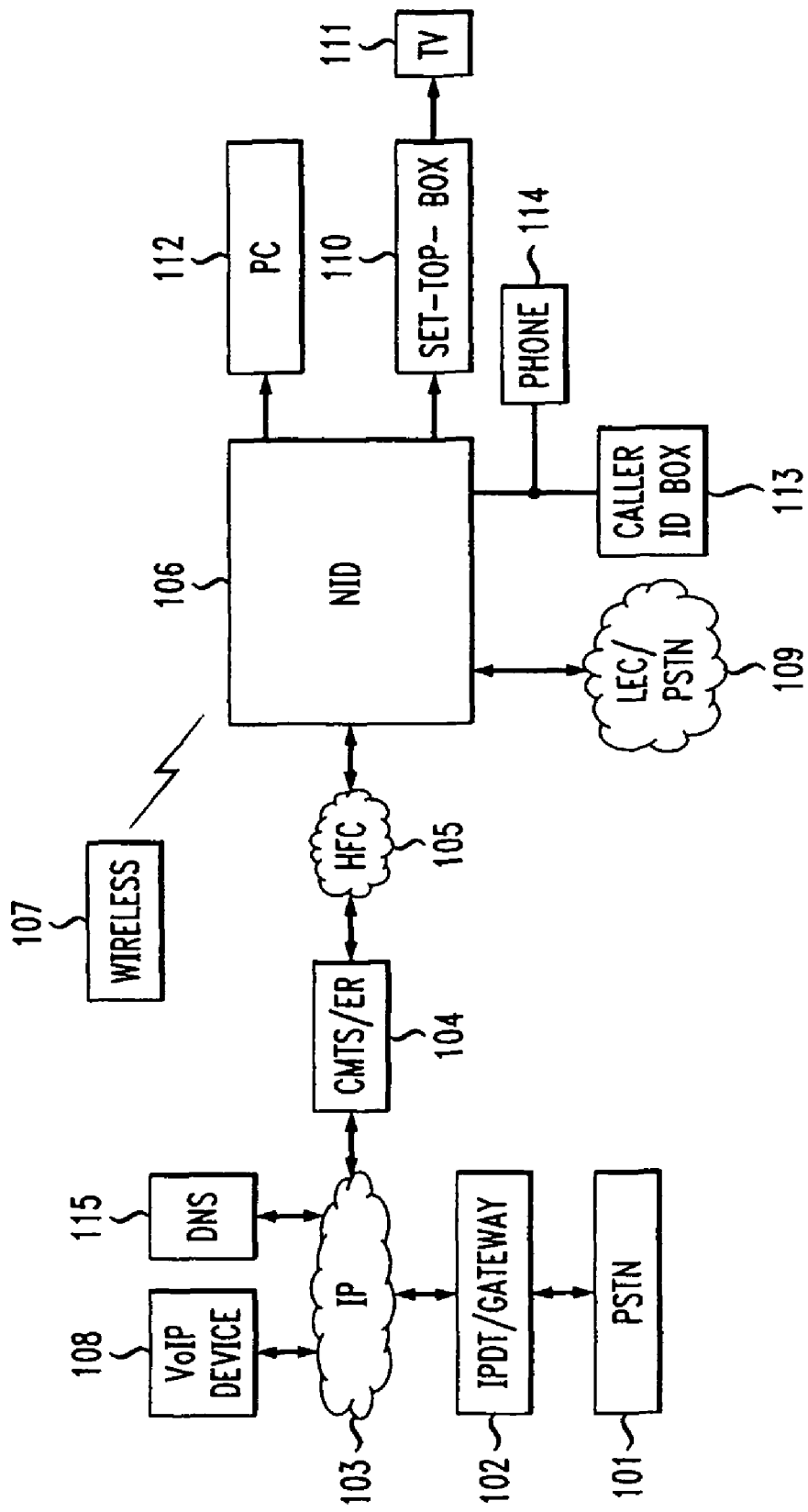
FIG. 1 illustrates an exemplary IP cable network incorporating a network interface device of the present invention.

FIG. 1 illustrates an exemplary embodiment of the present invention. The system of FIG. 1 may comprise a local switch within a Public Switched Telephone Network (PSTN) 101. The local switch 101 is connected to an Internet Protocol Digital Terminal Gateway (IPDT) 102 by a GR 303 interface (not shown), for example, and the IPDT 102 is connected to an IP network 103.

An incoming call may also be received through a Voice Over IP (VoIP) device 108 such as a computer or VoIP-enabled telephone and received from the VoIP device 108 through the IP network 103.

The incoming call received at the IP network 103 is sent to a cable modem termination system/end router (CMTS/ER) 104. The CMTS/ER 104 connects through a hybrid fiber coax (HFC) 105 to a Network Interface Device (NID) 106. A Domain Name Server (DNS) 115 stores IP addresses and line numbers of devices and/or NIDs. Incoming call devices may query the DNS 115 to determine data of desired NIDs 106. Thus, the NID 106 has the capability of receiving incoming calls through a cable or IP network and has the capability of processing an incoming call for CallerID information and multicasting the information to various appliances or end devices including, but not limited to, TVs 111 through a set-top box 110, a computer 112, a telephone 114 having a caller ID display as well as a separate caller ID box 113, as well as other appliances (not shown) that have caller ID display capability. The CallerID information may further be presented in audio format and multicast to devices having audio output capabilities including but not limited to stereos or radios.

In addition to receiving incoming calls through the IP network 103, CMTS/ER 104 and HFC 105, the NID 106 may also receive incoming calls directly from the Public Switching Telephone Network (PSTN) 109 or from a wireless device 107 such as a cellular telephone, for example.

Figure 2:
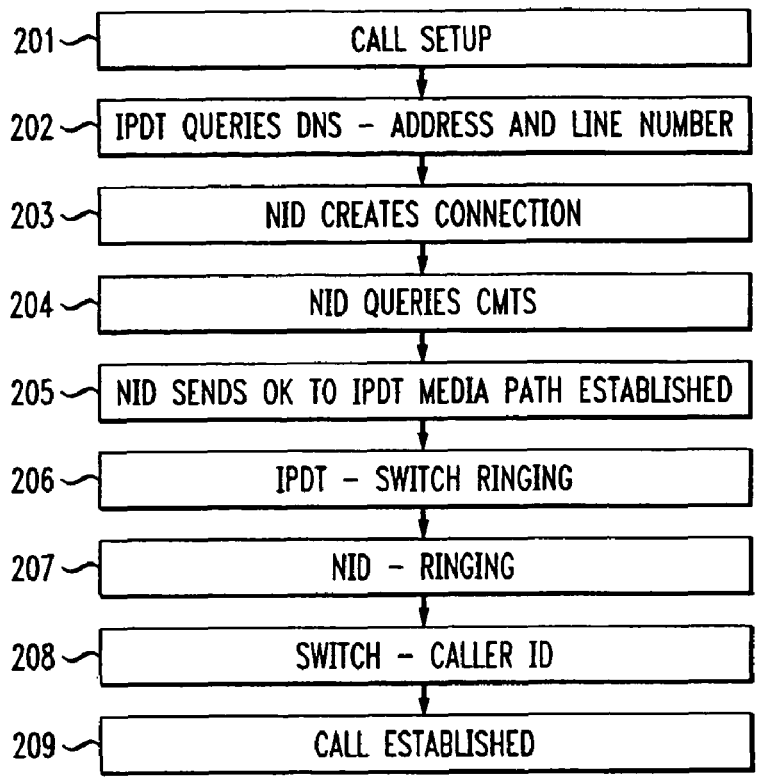
FIG. 2 is a flowchart illustrating an example of call flow in cable IP Telephony CallerID.

FIG. 2 is a flowchart illustrating an example of call flow in cable IP Telephony CallerID. In this example, an incoming call may be received at the switch 101 in the Public Switched Telephone Network (PSTN). The switch sets up the call and determines an interface group (IG) to provide a hybrid signaling for the incoming call and a Call Reference Value (CRV) for providing a local identifier for a given call (step 201). A media Path (i.e., RTP stream) is then established such that the IPDT/Gateway 102 may use the CRV and IG values and a mapped Fully Qualified Domain Name (FQDN) network interface device (ND) 106 port to query the Domain Name Server (DNS) 115 for an IP address and line number of the NID 106 (step 202). The IPDT 102 then requests to create a connection with the NID 106. This may be accomplished, for example, using a CRCX (create connection) command and indicating port number, NID line number, and Network Call Signaling (NCS) message (step 203). The NID 106 returns a request message (i.e., a DOCSIS message) to the Cable Modem Termination System/End Router (CMTS/ER) 104 to obtain information on resources and bandwidth (e.g., DSA-REQ (DOCSIS msg) (step 204). The CMTS/ER 104 returns a response message to the NID 106, such as a DSA-RSP (DOCSIS msg). The NID 106 receives the response message from the CMTS 104 and may acknowledge the response message (e.g., DSA-ACK (DOCSIS msg)) and send a confirmation message to the IPDT 102 such as a 200-OK message indicating the NID port number and NCS message. In this way, a media path (RTP stream) may be established between assigned ports on the NID 106 and the IPDT 102 (step 205).

The IPDT 102 may establish a loop with the switch 101. For example, the IPDT 102 may send a loop open hybrid signaling message and a connect message (e.g., CONNECT (DS0, CRV)) to the switch and the switch would return a ringing message to the IPDT 102 (step 206). The IPDT 102 receives the ringing message (e.g., ABCD (ringing)) and sends an RTP stream ringing message to the NID 106. The NID 106 responds by providing power ringing on the line associated with the called number (step 207).

The switch may send CallerID information to the telephone or external device or on TV via the external device via Frequency Shift Keying (FSK) signaling (step 208). In this way, the NID may "sniff" the CallerID information as it passes from the switch to a user destination device (DCT).

When the call is answered, the NID returns an off-hook signal to the IPDT and the call is established (step 209).

The illustrative embodiment demonstrates call flow at the NID. Call flow involves extracting CallerID information, obtaining destination IP address information, delivering CallerID information to an end device such as a Digital Carrier Termination set-top box, for example, and displaying CallerID information at an end device or a receiving site such as a television set, a computer or other appliance, machine, device, or multiple devices. CallerID information extraction may be accomplished by the NID. After applying, power ringing on the appropriate line with the called number, the NID may monitor CallerID in Frequency Shift Keying signaling of the voice stream and the CallerID information may be extracted when the NID "sniffs" the CallerID as it passes from the switch to the customer phone.

The NID may also obtain the destination IP address. The NID may access a configuration file and may obtain the IP address or an associated CallerID application port number of the end device such as a set-top box from the configuration file. After obtaining the IP address of the end device, the NID caches the IP address associated with the Fully Qualified Domain Name (FQDN). Parameters in the ND configuration file enable storage of the end device IP address and the end device FQDN. A Service Activation System (SAS) with an order entry screen and provisioning system interface may support a dynamic configuration file for the NID containing the end device FQDN.

The NID, after obtaining the end device IP address, sends the IP address to the CMTS/ER. The CMTS/ER provides the address for delivery of the IP data packet in a single data packet to the end device (e.g., the set-top box). The data packet is transmitted through UDP/IP to the end device and each packet will contain a Source ID destination ID string identifying the receiving application to the end device. Each packet may further contain application-specific data. For example, the data packet may contain any of packet type data, number of the calling party, the caller's name, number being called, maximum number of seconds the CallerID should be displayed (timeout), etc.

The data packet is sent via the NID to the end device (e.g., the set-top box) and CallerID application inside the end device may analyze the data packet. The end device may compare the number being called with phone numbers at the location and may trigger an on-screen display unit of the box to display the CallerID information. The NID is also capable of multicasting the CallerID information to any suitably equipped device in the vicinity, such as but not limited to TVs, computers, or any other machine, appliance, or device having display capability. Further, the NID is also capable of multicasting the CallerID information in audio format to any suitably equipped device in the vicinity with audio output capabilities such as but not limited to stereo receivers or radios.

Figure 3:
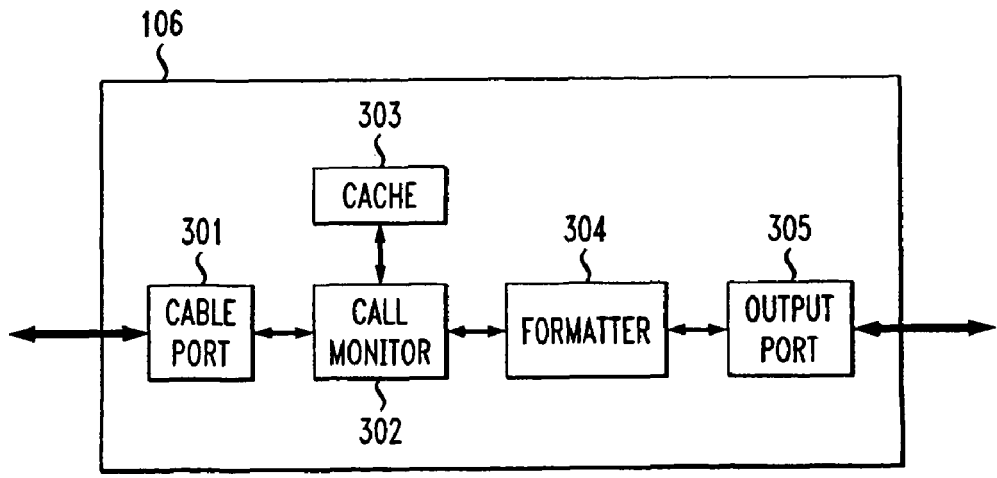
FIG. 3 is an exemplary Network Interface Device (NID) of the present invention.

FIG. 3 illustrates is an exemplary embodiment of the NID 106. In this embodiment, the NID 106 comprises a cable port 301 that receives input, including an IP address of an end device such as a set-top box, television, stereo, destination computer, or other device, for example. The cable port 301 may also receive CallerID application port number data for delivery of the CallerID data to the end device. The cable port 301 may be connected to a call monitor 302 that extracts CallerID information from an incoming cable IP call. The call monitor 302 thus "sniffs" the callerID from a call as it passed from the cable port 301. In addition, the NID 106 may discover an end device IP address and associated CallerID application port number from a configuration file (not shown). The configuration file may be located on a server in the network, for example. The IP address and associated data may be stored in the cache 303 with a corresponding FQDN. A service activation system creates a dynamic configuration file for the NID containing the FQDN of a selected end device, such as a set-up box. A formatter 303 formats the received callerID packet for delivery to the end device via the CMTS 104. The data packet typically comprises a source ID destination ID string, which identifies the receiving application in the end device. The remainder of the packet may be application-specific. For example, the packet may contain but is not limited to packet type, number of the calling party, caller's name, number being called, or timeout. The timeout value can be provisioned locally or may be fixed for the end devices. The NID 106 may also comprise an output port 305, which may send data packets to the end device (not shown).

The NID 106 may communicate with the CMTS 104. For example, the IP address of the end device may be sent through the cable port 301 of the NID 106 to the CMTS 104. The CMTS 104 may deliver the data packet in a single data packet through, for example, User Datagram Protocol/Internet Protocol (UDP/IP) to the end device via the NID 106.

Thus, an exemplary system and network interface device (NID) 106 is described for receiving an incoming call via a variety of networks such as a cable IP network via hybrid fiber/coax (HFC), determining CallerID information from the incoming call, and multicasting the CallerID information to a plurality of end devices. The NID 106 detects and extracts CallerID information, formats the CallerID data packet for delivery to at least one end device and determines an IP address and associated CallerID application port number of the at least one end device. Delivery of the CallerID information may be accomplished via a CMTS 104.

Although illustrative embodiments of the invention have been shown and described, a wide range of modification, change and substitution is intended in the foregoing disclosure and in some instances some features of the present invention may be employed without a corresponding use of the other features. It should be noted that the invention can be practiced otherwise than as specifically illustrated and described without departing from its spirit or scope.

What is claimed is:

1. A network interface device adapted to receive a first telephone call via a Public Switched Telephone Network (PSTN) and a second telephone call via a Voice Over IP (VoIP) system, receipt of the first telephone call not concurrent with receipt of the second telephone call, the network interface device further adapted to extract CallerID information from an incoming cable IP call and deliver the CallerID information to a plurality of end devices, the network interface device comprising:
   a cable port;
   a call monitor adapted for extracting the CallerID information from the incoming cable IP call received via the cable port;
   a cache adapted for storing an IP address and a corresponding application port of one or more end devices of the plurality of end devices;
   a formatter adapted for formatting a CallerID data packet and for delivering the CallerID data packet to the plurality of end devices; and
   an output port via which the CallerID data packet is transmitted to the plurality of end devices using a multicast transmission, wherein a first end device of the plurality of end devices presents an audio representation of the CallerID information based on the CallerID data packet, and wherein a second end device of the plurality of end devices presents a visual representation of the CallerID information based on the CallerID data packet.

2. The device of claim 1, wherein the extracting of the CallerID information is based on monitoring frequency shift keying signaling associated with the incoming cable IP call.

3. The device of claim 2, further comprising a cable modem termination system (CMTS) connected to the cable port via a hybrid fiber coax (HFC) for routing data packets to the network interface device, wherein the cable port receives an IP address of the one or more end devices and CallerID application port number data from a configuration file in a server.

4. The device of claim 3, wherein the IP address of the one or more end devices is stored in the cache.

5. The device of claim 4, wherein the cable port sends the IP address of the one or more end devices to the CMTS.

6. The device of claim 5, wherein the cable port receives a data packet from the CMTS, the data packet comprising a Source ID destination ID string.

7. The device of claim 6, wherein the data packet further comprises a field selected from the group consisting of packet type, number of calling party, caller's name, number being called, and timeout.

8. The device of claim 6, wherein the output port sends the data packet to the one or more end devices.

9. The device of claim 1, wherein the cable port receives an IP address of the one or more end devices and CallerID application port number data from a configuration file in a server.

10. The device of claim 9, wherein the cable port sends the IP address of the one or more end devices to a Cable Modem Termination System (CMTS) and receives a data packet from the CMTS, the data packet comprising a Source ID destination ID string.

11. The device of claim 10, wherein the data packet further comprises a field selected from the group consisting of packet type, number of calling party, caller's name, number being called, and timeout.

12. The device of claim 10, wherein the output port sends the data packet to the one or more end devices.

13. The network of claim 1, wherein the network interface device triggers an onscreen display unit to display CallerID information and line number at the one or more end devices.

14. A method for delivering CallerID information comprising:
   receiving an incoming call via a device adapted to receive a first telephone call via a Public Switched Telephone Network (PSTN) and a second telephone call via a Voice Over IP (VoIP) system, receipt of the first telephone call not concurrent with receipt of the second telephone call;
   extracting CallerID information from the incoming call;
   identifying an IP address and an application port number corresponding to one or more end devices of a group of end devices; and
   delivering the CallerID information to first and second end devices of the group of end devices, the first end device presenting an audio representation of the CallerID information based on the delivery of the CallerID information and the second end device presenting a visual representation of the CallerID information based on the delivery of the CallerID information.

15. The method of claim 14, wherein the step of delivering comprises:
   querying a Cable Modem Termination System/End Router (CMTSIER); and
   delivering a data packet to the first and second end devices via multicast transmission, wherein the data packet comprises a Source ID destination ID string for identifying the receiving application to the first and second end devices.

16. The method of claim 15, wherein the data packet further comprises fields selected from the group consisting of packet type, number of calling party, caller's name, number being called, and timeout.

17. The method of claim 14, further comprising multicasting the CallerID information to the first and second end devices.

18. The method of claim 17, wherein the first or second end device is selected from the group consisting of a set-top box, a television, a stereo receiver, and a computer.

19. The method of claim 14, wherein the extracting of the CallerID information is based on monitoring frequency shift keying signaling associated with the incoming call.

20. A method comprising:
   receiving an incoming call at a device;
   extracting CallerID information from the incoming call; and
   delivering the CallerID information via multicast transmission to first and second end devices, wherein the first end device presents an audio representation of the CallerID information and wherein the second end device presents a visual representation of the CallerID information.

21. The method of claim 20, comprising:
identifying an IP address and an application port number corresponding to one or more end devices of a group of end devices that includes the first and second end devices; and
storing the IP address and a corresponding fully qualified domain name in a memory of a network interface device.

* * * * *